United States Patent
Hewlett, II et al.

(10) Patent No.: US 11,636,208 B2
(45) Date of Patent: Apr. 25, 2023

(54) GENERATING MODELS FOR PERFORMING INLINE MALWARE DETECTION

(71) Applicant: Palo Alto Networks, Inc., Santa Clara, CA (US)

(72) Inventors: William Redington Hewlett, II, Mountain View, CA (US); Suiqiang Deng, Fremont, CA (US); Sheng Yang, Santa Clara, CA (US); Ho Yu Lam, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 65 days.

(21) Appl. No.: 16/517,465

(22) Filed: Jul. 19, 2019

(65) Prior Publication Data
US 2021/0019412 A1 Jan. 21, 2021

(51) Int. Cl.
*G06F 21/56* (2013.01)
*G06N 20/00* (2019.01)

(52) U.S. Cl.
CPC .......... *G06F 21/567* (2013.01); *G06F 21/565* (2013.01); *G06N 20/00* (2019.01); *G06F 2221/034* (2013.01)

(58) Field of Classification Search
CPC .... G06F 21/567; G06F 21/565; G06F 21/561; G06F 21/562; G06F 21/563; G06F 21/564; G06F 2221/034; G06N 20/00; H04L 29/068777; H04L 29/06557; H04L 63/0263; H04L 63/0227; H04L 63/14; H04L 63/1416; H04L 63/1425; H04L 63/0245
See application file for complete search history.

(56) References Cited

U.S. PATENT DOCUMENTS

| | | | |
|---|---|---|---|
| 7,792,850 B1 * | 9/2010 | Raffill | G06F 16/285 |
| | | | 707/758 |
| 9,396,334 B1 * | 7/2016 | Ivanov | G06F 16/188 |
| 10,681,080 B1 * | 6/2020 | Chen | G06F 21/562 |
| 10,878,124 B1 * | 12/2020 | Sitaraman | G06N 5/047 |
| 10,942,963 B1 * | 3/2021 | Huang | G06F 16/355 |
| 2005/0256716 A1 * | 11/2005 | Bangalore | G10L 13/033 |
| | | | 704/260 |
| 2009/0319536 A1 | 12/2009 | Parker | |
| 2010/0064369 A1 * | 3/2010 | Stolfo | G06F 21/50 |
| | | | 726/24 |

(Continued)

FOREIGN PATENT DOCUMENTS

WO WO-2020006415 A1 * 1/2020 ........... G06F 21/566

OTHER PUBLICATIONS

Raff et al., Hash-Grams: Faster N-Gram Features for Classification and Malware Detection, Proceedings of the ACM Symposium on Document Engineering, Jul. 2018, ACM.

(Continued)

*Primary Examiner* — Richard A McCoy
(74) *Attorney, Agent, or Firm* — Van Pelt, Yi & James LLP

(57) ABSTRACT

Generating models usable by data appliances to perform inline malware analysis is disclosed. A set of features, including a plurality of n-grams, extracted from a set of files is received. A reduced set of features is determined that includes at least some of the plurality of n-grams. The reduced set of features is used to generate a model usable by a data appliance to perform inline malware analysis.

27 Claims, 11 Drawing Sheets

(56) References Cited

U.S. PATENT DOCUMENTS

| | | | |
|---|---|---|---|
| 2014/0033307 A1* | 1/2014 | Schmidtler | H04L 63/1483 |
| | | | 726/22 |
| 2014/0223565 A1 | 8/2014 | Cohen | |
| 2015/0244730 A1 | 8/2015 | Vu | |
| 2017/0004306 A1 | 1/2017 | Zhang | |
| 2017/0085585 A1 | 3/2017 | Libor | |
| 2017/0262633 A1 | 9/2017 | Miserendino | |
| 2018/0013772 A1* | 1/2018 | Schmidtler | H04L 63/145 |
| 2018/0048659 A1 | 2/2018 | Salsamendi | |
| 2018/0089365 A1 | 3/2018 | Beal | |
| 2018/0203998 A1* | 7/2018 | Maisel | G06N 20/00 |
| 2018/0300482 A1* | 10/2018 | Li | G06F 21/565 |
| 2019/0034632 A1* | 1/2019 | Tsao | H04L 63/1425 |
| 2019/0087574 A1 | 3/2019 | Schmidtler | |
| 2019/0095820 A1* | 3/2019 | Pourmohammad | G06N 20/20 |
| 2019/0096214 A1 | 3/2019 | Pourmohammad | |
| 2019/0180175 A1* | 6/2019 | Meteer | G06F 3/04812 |
| 2019/0354682 A1* | 11/2019 | Finkelshtein | G06N 20/00 |
| 2020/0067861 A1* | 2/2020 | Leddy | G06Q 30/0185 |
| 2020/0076835 A1* | 3/2020 | Ladnai | G06F 21/562 |
| 2020/0097655 A1 | 3/2020 | Rihn | |
| 2020/0125728 A1 | 4/2020 | Savir | |
| 2020/0213325 A1* | 7/2020 | Scherman | H04L 63/1425 |
| 2020/0364334 A1* | 11/2020 | Pevny | G06N 3/08 |
| 2021/0019408 A1* | 1/2021 | Chrysaidos | G06F 21/566 |
| 2021/0224534 A1* | 7/2021 | Miller | G06V 30/416 |

OTHER PUBLICATIONS

Santos et al., N-Grams-Based File Signatures for Malware Detection, ICEIS, 2009, pp. 317-320.

Shafiq et al., Embedded Malware Detection Using Markov n-Grams, Proceedings of the 5th International Conference on Detection of Intrusions and Malware, and Vulnerability Assessment, Jul. 2008, pp. 88-107, Springer-Verlag.

Hadžiosmanović et al., N-Gram Against the Machine: On the Feasibility of the N-Gram Network Analysis for Binary Protocols, International Workshop on Recent Advances in Intrusion Detection, 2012, pp. 354-373.

Li et al., Fileprints: Identifying File Types by n-gram Analysis, Proceedings of the 2005 IEEE Workshop on Information Assurance, Jun. 2005.

Oza et al., HTTP Attack Detection Using N-Gram Analysis, Computers & Security 45, 2014, pp. 242-254.

Chen et al., TinyDroid: A Lightweight and Efficient Model for Android Malware Detection and Classification, Mobile Information Systems, 2018, vol. 2018.

Kang et al., N-gram Opcode Analysis for Android Malware Detection, Intl. Journal on Cyber Situational Awareness, 2016, vol. 1, No. 1.

Pektas et al., Proposal of N-gram Based Algorithm for Malware Classification, The Fifth International Conference on Emerging Security Information, Systems and Technologies, Aug. 2011, pp. 7-13.

* cited by examiner

```
{
"sha256": a4ad658885d117dde5ce2a705339b606fa0d17bf2eb7e2812f6da6a9db775e0c, ⎫706
"finish_date":1540078429, ⎭704
"overlay":{ 'd00fbf4e088bc366': 1, '4dfc8b45f0e8340c': 1, 'c0556805 9b410064': 1, ⎫708
'95fceffff8bc78b': 2, ......},
"ngram":{ '0c8d3370170ed806': 1, '10350434f1b59287': 1, 'c036c953089ec437': 1,
'022ed9047029ef1e': 1, 'a311c677001e4106': 1, ......},
"hasOverlay":1, ⎫710
"ftype":exe, ⎫712
"create_time":1540077962, ⎭714
"other_features": {'J210': 0.0, 'J209': 0.0, 'J178': 0.0, ⎫
'J164': 1.0, 'J167': 708992512.0, ......}, │
'J194': 0.0, 'J195': 0.0, │
lisa [0, 0, 0, 0.0, 3.0, 0, 1100.0, 1021.0, 1156.0, 1895.0, 0, 2752.0, 1372.0, 0, 0, │716
0.0, 0, 0, 0, 0, 0, 0.0, 0, 929.0, 0, 11402.0, 904.0, 65510.0, 1295.0, 0, 851.0, │
3608.0, 5129.0, 67092.0, 0, 3205.0, 0, 3423.0, 11934.0, 0, 0, 0, 0, 0, 0, 2835.0, │
......], ⎭
"verdict": 1 ⎫718
}
```

FIG. 7A

```
4d73f42438fb5a8579l5219cdfa9cbb4ce3f771ffed93af81b0528931e4813f8:
3905:7    3799:3   3586:3   3794:3   522:3    1156:1   2269:3   3742:2   52:3     1273:2   3680:3   736:1    3948:3
3803:3    11:1     1:2      3817:2   237:1    3816:2   477:1    971:1    3493:1   1351:1   3884:3   3780:1   16:2
2793:1    521:3    3743:2   3238:2   417:3    234:3    338:3    1012:1   480:1    1438:4   319:1    1084:1   3495:1
1133:1    3964:3   565:1    1212:1   212:1    861:1    3992:2   3946:3   171:2    3997:3   3757:1   1018:2   304:1
3673:2    3955:1   525:3    317:1    1185:1   1288:4   9:1      3826:1   3766:4   3605:1   482:1    963:3    3827:1
240:1     320:1    1161:1   1005:1   241:1    2359:1   3599:1   863:1    1017:2   390:15   3812:2   649:2    3950:3
1147:1    3993:2   3890:1   561:1    3951:3   3996:3   3883:3   3944:3   1193:2   3915:1   1086:1   467:1    3512:1
2:2       1157:1   131:1    3929:1   876:1    478:1    1000:1   340:3    3762:2   3933:1   3632:1   1390:2   544:1
3585:2    20:1     492:3    245:1    3392:1   3934:1   1349:1   295:1    13:1     3790:3   559:1    10:1     239:1
484:1     3990:2   3813:2   526:1    3956:3   8:2      1148:3   398:2    643:1    3783:1   3991:3   1042:1   318:1
1020:2
1224:2    252:1    3949:3   704:1    1500:2   242:1    1322:1   303:1    236:2    1155:2   214:1    3491:1   248:1
1132:1    859:1    3941:1   11131:1  3998:3   3832:1   397:2    648:2    2532:3   572:1    3904:1   549:1    3785:4
3255:1    3911:3   1043:1   3572:3   53:3     278:1    3815:2   3792:2   3570:3   178:1    3566:4   479:1    469:1
3725:1    3945:3   1223:2   3600:1   19:1     1233:2   1257:1   1505:2   560:1    987:1    3999:3   2754:4   3608:1
170:2     1365:4   1210:1   872:1    270:3    3760:2   3805:3   1505:1   389:15   301:1    3692:1   12:2     2992:4
509:3     3920:1   1003:2   1028:3   3909:7   3995:2   3994:2   292:1    880:1    1344:1   3651:2   965:1    7:2
3795:3
1373:1    1186:1   3582:1   155:1    112:1    415:3    3965:3   291:1    1134:1   557:1    3756:1   1085:1   866:1
3947:3    875:1    523:3    1403:2   J26:0    J30:0    J16:0    J15:1    J12:0    J11:0    J14:0    J13:0    J19:1
J18:0     J31:0                      J34:0    J25:0    J24:0    J23:1    J22:6    J21:10   J20:0    J32:0    J17:0
J0:6      J27:1    J28:0    J35:0    J7:0     J8:0     J2:0     J3:1     J4:0     J1:0     J29:1    J33:0
J9:0      J10:0    J5:0     J6:0
```

FIG. 7B

GENERATING MODELS FOR PERFORMING INLINE MALWARE DETECTION

BACKGROUND OF THE INVENTION

Malware is a general term commonly used to refer to malicious software (e.g., including a variety of hostile, intrusive, and/or otherwise unwanted software). Malware can be in the form of code, scripts, active content, and/or other software. Example uses of malware include disrupting computer and/or network operations, stealing proprietary information (e.g., confidential information, such as identity, financial, and/or intellectual property related information), and/or gaining access to private/proprietary computer systems and/or computer networks. Unfortunately, as techniques are developed to help detect and mitigate malware, nefarious authors find ways to circumvent such efforts. Accordingly, there is an ongoing need for improvements to techniques for identifying and mitigating malware.

BRIEF DESCRIPTION OF THE DRAWINGS

Various embodiments of the invention are disclosed in the following detailed description and the accompanying drawings.

FIG. 7A illustrates an example hash table for a file.

FIG. 7B illustrates an example threat signature for a sample.

DETAILED DESCRIPTION

Figure 1:
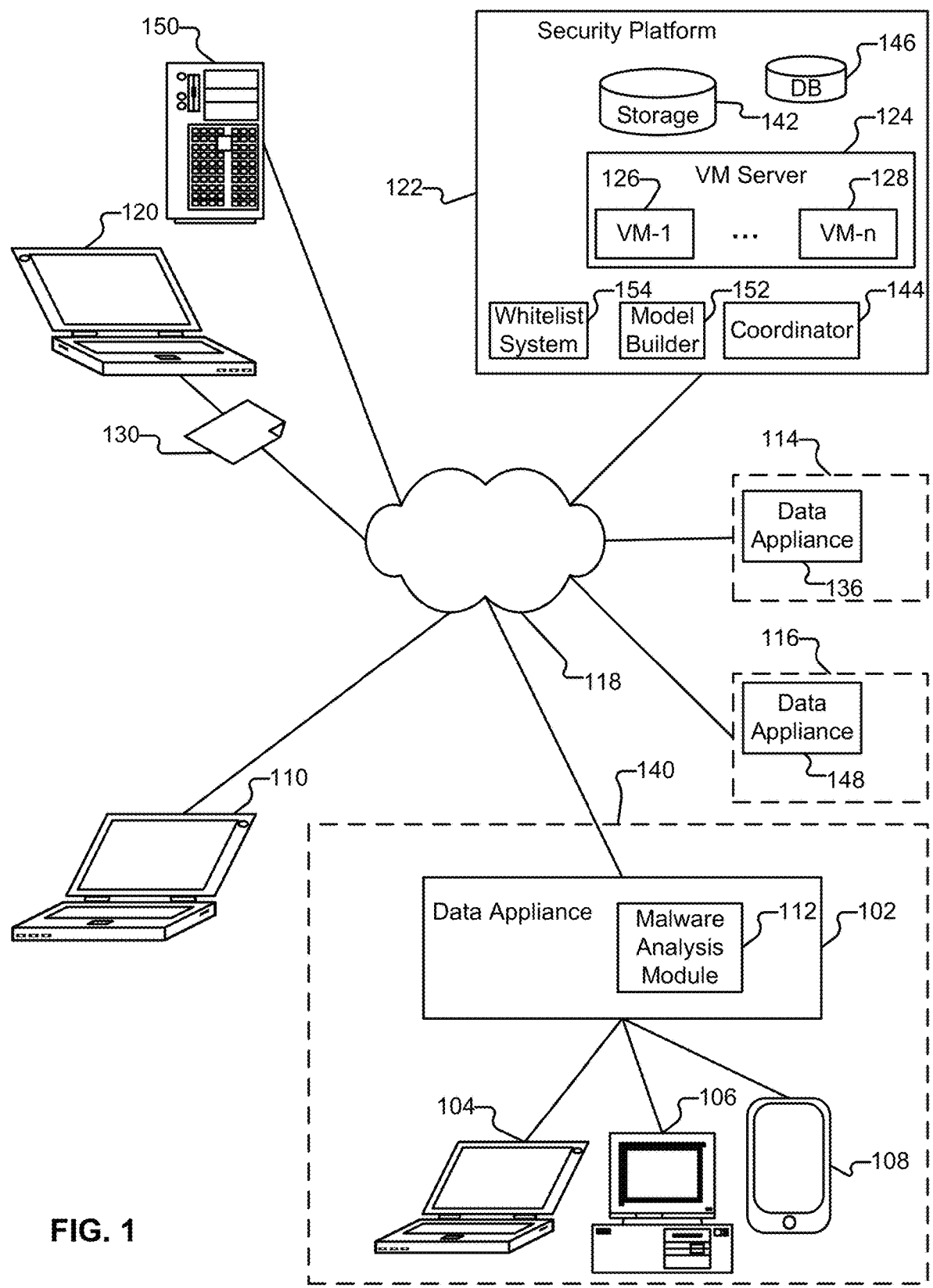
FIG. 1 illustrates an example of an environment in which malicious applications are detected and prevented from causing harm.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

I. Overview

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provides higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

II. Example Environment

FIG. 1 illustrates an example of an environment in which malicious applications ("malware") are detected and prevented from causing harm. As will be described in more detail below, malware classifications (e.g., as made by security platform 122) can be variously shared and/or refined among various entities included in the environment shown in FIG. 1. And, using techniques described herein, devices, such as endpoint client devices 104-110 can be protected from such malware.

The term "application" is used throughout the Specification to collectively refer to programs, bundles of programs, manifests, packages, etc., irrespective of form/platform. An "application" (also referred to herein as a "sample") can be a standalone file (e.g., a calculator application having the filename "calculator.apk" or "calculator.exe") and can also be an independent component of another application (e.g., a mobile advertisement SDK or library embedded within the calculator app).

"Malware" as used herein refers to an application that engages in behaviors, whether clandestinely or not (and whether illegal or not), of which a user does not approve/would not approve if fully informed. Examples of malware include Trojans, viruses, rootkits, spyware, hacking tools, keyloggers, etc. One example of malware is a desktop application that collects and reports to a remote server the end user's location (but does not provide the user with location-based services, such as a mapping service). Another example of malware is a malicious Android Application Package .apk (APK) file that appears to an end user to be a free game, but stealthily sends SMS premium messages (e.g., costing $10 each), running up the end user's phone bill. Another example of malware is an Apple iOS flashlight application that stealthily collects the user's contacts and sends those contacts to a spammer. Other forms of malware can also be detected/thwarted using the techniques described herein (e.g., ransomware). Further, while n-grams/feature vectors/output accumulation variables are described herein as being generated for malicious applications, techniques described herein can also be used in various embodiments to generate profiles for other kinds of applications (e.g., adware profiles, goodware profiles, etc.).

Techniques described herein can be used in conjunction with a variety of platforms (e.g., desktops, mobile devices, gaming platforms, embedded systems, etc.) and/or a variety of types of applications (e.g., Android .apk files, iOS applications, Windows PE files, Adobe Acrobat PDF files, etc.). In the example environment shown in FIG. 1, client devices 104-108 are a laptop computer, a desktop computer, and a tablet (respectively) present in an enterprise network 140. Client device 110 is a laptop computer present outside of enterprise network 140.

Data appliance 102 is configured to enforce policies regarding communications between client devices, such as client devices 104 and 106, and nodes outside of enterprise network 140 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers. In some embodiments, data appliance 102 is also configured to enforce policies with respect to traffic that stays within enterprise network 140.

Figure 2A:
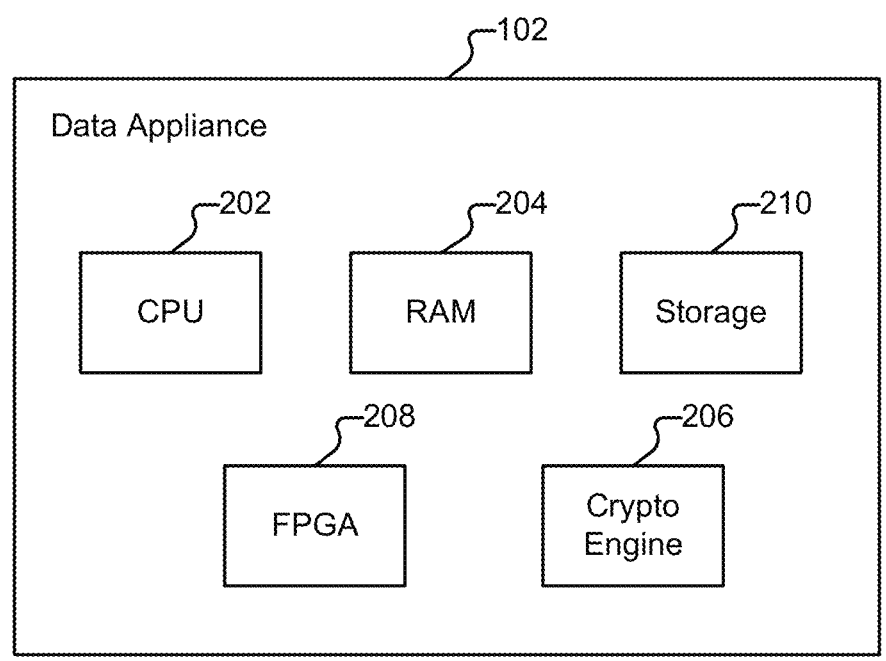
FIG. 2A illustrates an embodiment of a data appliance.

An embodiment of a data appliance is shown in FIG. 2A. The example shown is a representation of physical components that are included in data appliance 102, in various embodiments. Specifically, data appliance 102 includes a high performance multi-core Central Processing Unit (CPU) 202 and Random Access Memory (RAM) 204. Data appliance 102 also includes a storage 210 (such as one or more hard disks or solid state storage units). In various embodiments, data appliance 102 stores (whether in RAM 204, storage 210, and/or other appropriate locations) information used in monitoring enterprise network 140 and implementing disclosed techniques. Examples of such information include application identifiers, content identifiers, user identifiers, requested URLs, IP address mappings, policy and other configuration information, signatures, hostname/URL categorization information, malware profiles, and machine learning models. Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. The functionality provided by data appliance 102 can also be integrated into or executed as software on a general purpose computer, a computer server, a gateway, and/or a network/routing device. In some embodiments, at least some services described as being provided by data appliance 102 are instead (or in addition) provided to a client device (e.g., client device 104 or client device 110) by software executing on the client device.

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing—Social Networking; Web Browsing—News; SSH; and so on.

Figure 2B:
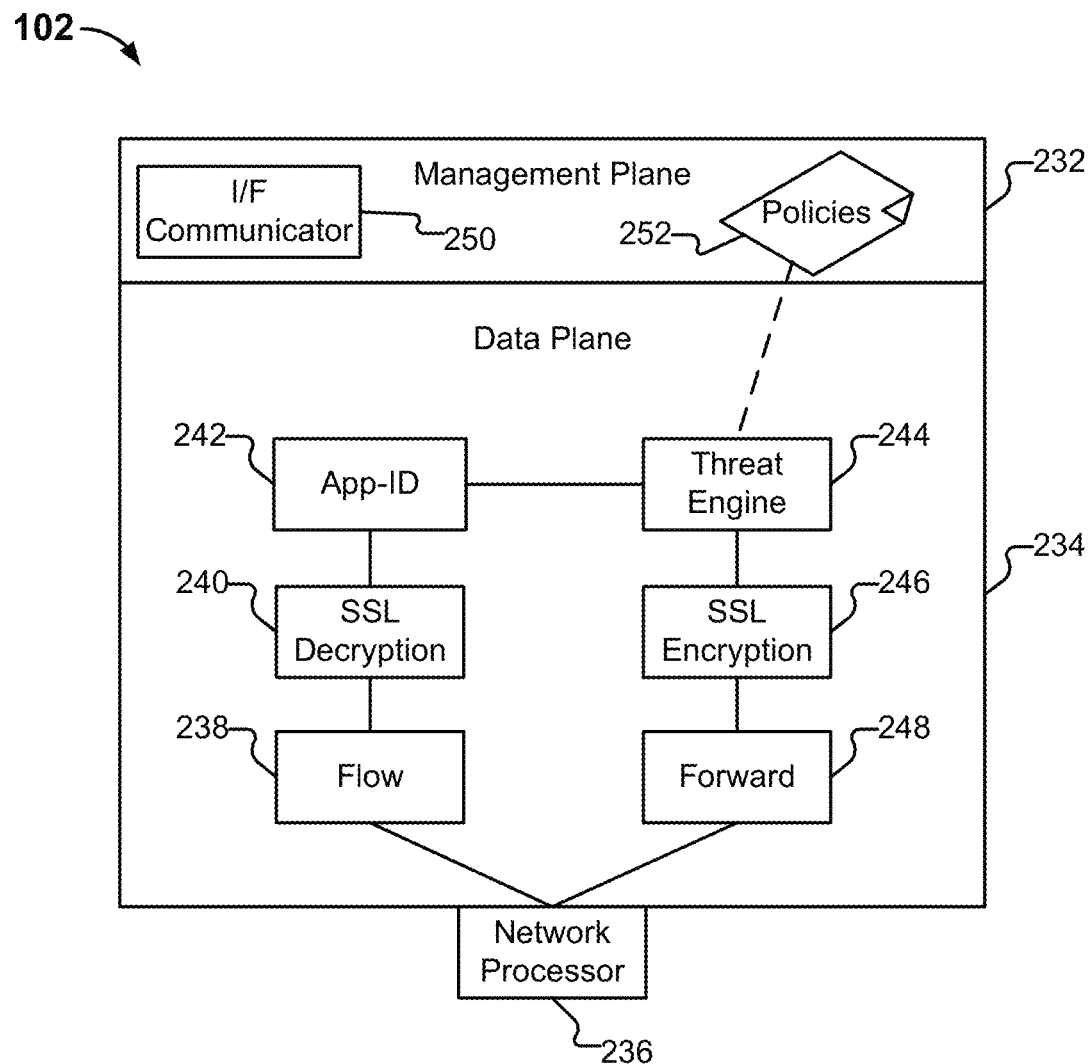
FIG. 2B is a functional diagram of logical components of an embodiment of a data appliance.

FIG. 2B is a functional diagram of logical components of an embodiment of a data appliance. The example shown is a representation of logical components that can be included in data appliance 102 in various embodiments. Unless otherwise specified, various logical components of data appliance 102 are generally implementable in a variety of ways, including as a set of one or more scripts (e.g., written in Java, python, etc., as applicable).

As shown, data appliance 102 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling.

Network processor 236 is configured to receive packets from client devices, such as client device 108, and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help data appliance 102 inspect and control SSL/TLS and SSH encrypted traffic, and thus help to stop threats that might otherwise remain hidden in encrypted traffic. Decryption engine 240 can also help prevent sensitive content from leaving enterprise network 140. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 242 is configured to determine what type of traffic a session involves. As one example, application identification engine 242 can recognize a GET request in received data and conclude that the session requires an HTTP decoder. In some cases, e.g., a web browsing session, the identified application can change, and such changes will be noted by data appliance 102. For example, a user may initially browse to a corporate Wiki (classified based on the URL visited as "Web Browsing—Productivity") and then subsequently browse to a social networking site (classified based on the URL visited as "Web Browsing—Social Networking"). Different types of protocols have corresponding decoders.

Based on the determination made by application identification engine 242, the packets are sent, by threat engine 244, to an appropriate decoder configured to assemble packets (which may be received out of order) into the correct order, perform tokenization, and extract out information. Threat engine 244 also performs signature matching to determine what should happen to the packet. As needed, SSL encryption engine 246 can re-encrypt decrypted data. Packets are forwarded using a forward module 248 for transmission (e.g., to a destination).

As also shown in FIG. 2B, policies 252 are received and stored in management plane 232. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 250 is provided for management communications (e.g., via (REST) APIs, messages, or network protocol communications or other communication mechanisms).

III. Security Platform

Returning to FIG. 1, suppose a malicious individual (using system 120) has created malware 130. The malicious individual hopes that a client device, such as client device 104, will execute a copy of malware 130, compromising the client device, and, e.g., causing the client device to become a bot in a botnet. The compromised client device can then be instructed to perform tasks (e.g., cryptocurrency mining, or participating in denial of service attacks) and to report information to an external entity, such as command and control (C&C) server 150, as well as to receive instructions from C&C server 150, as applicable.

Suppose data appliance 102 has intercepted an email sent (e.g., by system 120) to a user, "Alice," who operates client device 104. A copy of malware 130 has been attached by system 120 to the message. As an alternate, but similar scenario, data appliance 102 could intercept an attempted download by client device 104 of malware 130 (e.g., from a website). In either scenario, data appliance 102 determines whether a signature for the file (e.g., the email attachment or website download of malware 130) is present on data appliance 102. A signature, if present, can indicate that a file is known to be safe (e.g., is whitelisted), and can also indicate that the file is known to be malicious (e.g., is blacklisted).

In various embodiments, data appliance 102 is configured to work in cooperation with security platform 122. As one example, security platform 122 can provide to data appliance 102 a set of signatures of known-malicious files (e.g., as part of a subscription). If a signature for malware 130 is included in the set (e.g., an MD5 hash of malware 130), data appliance 102 can prevent the transmission of malware 130 to client device 104 accordingly (e.g., by detecting that an MD5 hash of the email attachment sent to client device 104 matches the MD5 hash of malware 130). Security platform 122 can also provide to data appliance 102 a list of known malicious domains and/or IP addresses, allowing data appliance 102 to block traffic between enterprise network 140 and C&C server 150 (e.g., where C&C server 150 is known to be malicious). The list of malicious domains (and/or IP addresses) can also help data appliance 102 determine when one of its nodes has been compromised. For example, if client device 104 attempts to contact C&C server 150, such attempt is a strong indicator that client 104 has been compromised by malware (and remedial actions should be taken accordingly, such as quarantining client device 104 from communicating with other nodes within enterprise network 140). As will be described in more detail below, security platform 122 can also provide other types of information to data appliance 102 (e.g., as part of a subscription) such as a set of machine learning models usable by data appliance 102 to perform inline analysis of files.

A variety of actions can be taken by data appliance 102 if no signature for an attachment is found, in various embodiments. As a first example, data appliance 102 can fail-safe, by blocking transmission of any attachments not whitelisted as benign (e.g., not matching signatures of known good files). A drawback of this approach is that there may be many legitimate attachments unnecessarily blocked as potential malware when they are in fact benign. As a second example, data appliance 102 can fail-danger, by allowing transmission of any attachments not blacklisted as malicious (e.g., not matching signatures of known bad files). A drawback of this approach is that newly created malware (previously unseen by platform 122) will not be prevented from causing harm.

As a third example, data appliance 102 can be configured to provide the file (e.g., malware 130) to security platform 122 for static/dynamic analysis, to determine whether it is malicious and/or to otherwise classify it. A variety of actions can be taken by data appliance 102 while analysis by security platform 122 of the attachment (for which a signature is not already present) is performed. As a first example, data appliance 102 can prevent the email (and attachment) from being delivered to Alice until a response is received from security platform 122. Assuming platform 122 takes approximately 15 minutes to thoroughly analyze a sample, this means that the incoming message to Alice will be delayed by 15 minutes. Since, in this example, the attachment is malicious, such a delay will not impact Alice negatively. In an alternate example, suppose someone has sent Alice a time sensitive message with a benign attachment for which a signature is also not present. Delaying delivery of the message to Alice by 15 minutes will likely be viewed (e.g., by Alice) as unacceptable. As will be described in more detail below, an alternate approach is to perform at least some real-time analysis on the attachment on data appliance 102 (e.g., while awaiting a verdict from platform 122). If data appliance 102 can independently determine whether the attachment is malicious or benign, it can take an initial action (e.g., block or allow delivery to Alice), and can adjust/take additional actions once a verdict is received from security platform 122, as applicable.

Security platform 122 stores copies of received samples in storage 142 and analysis is commenced (or scheduled, as applicable). One example of storage 142 is an Apache Hadoop Cluster (HDFS). Results of analysis (and additional information pertaining to the applications) are stored in database 146. In the event an application is determined to be malicious, data appliances can be configured to automatically block the file download based on the analysis result. Further, a signature can be generated for the malware and distributed (e.g., to data appliances such as data appliances 102, 136, and 148) to automatically block future file transfer requests to download the file determined to be malicious.

In various embodiments, security platform 122 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 122 can be implemented across a scalable infrastructure comprising multiple such servers, solid state drives, and/or other applicable high-performance hardware. Security platform 122 can comprise several distributed components, including components provided by one or more third parties. For example, portions or all of security platform 122 can be implemented using the Amazon Elastic Compute Cloud (EC2) and/or Amazon Simple Storage Service (S3). Further, as with data appliance 102, whenever security platform 122 is referred to as performing a task, such as storing data or processing data, it is to be understood that a sub-component or multiple sub-components of security platform 122 (whether individually or in cooperation with third party components) may cooperate to perform that task. As one example, security platform 122 can optionally perform static/dynamic analysis in cooperation with one or more virtual machine (VM) servers, such as VM server 124.

An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 122, but may also be provided by a third party. As one example, the virtual machine server can rely on EC2, with the remainder portions of security platform 122 provided by dedicated hardware owned by and under the control of the operator of security platform 122. VM server 124 is configured to provide one or more virtual machines 126-128 for emulating client devices. The virtual machines can execute a variety of operating systems and/or versions thereof. Observed behaviors resulting from executing applications in the virtual machines are logged and analyzed (e.g., for indications that the application is malicious). In some embodiments, log analysis is performed by the VM server (e.g., VM server 124). In other embodiments, analysis is performed at least in part by other components of security platform 122, such as a coordinator 144.

In various embodiments, security platform 122 makes available results of its analysis of samples via a list of signatures (and/or other identifiers) to data appliance 102 as part of a subscription. For example, security platform 122 can periodically send a content package that identifies malware apps (e.g., daily, hourly, or some other interval, and/or based on an event configured by one or more policies). An example content package includes a listing of identified malware apps, with information such as a package name, a hash value for uniquely identifying the app, and a malware name (and/or malware family name) for each identified malware app. The subscription can cover the analysis of just those files intercepted by data appliance 102 and sent to security platform 122 by data appliance 102, and can also cover signatures of all malware known to security platform 122 (or subsets thereof, such as just mobile malware but not other forms of malware (e.g., PDF malware)). As will be described in more detail below, platform 122 can also make available other types of information, such as machine learning models that can help data appliance 102 detect malware (e.g., through techniques other than hash-based signature matching).

In various embodiments, security platform 122 is configured to provide security services to a variety of entities in addition to (or, as applicable, instead of) an operator of data appliance 102. For example, other enterprises, having their own respective enterprise networks 114 and 116, and their own respective data appliances 136 and 148, can contract with the operator of security platform 122. Other types of entities can also make use of the services of security platform 122. For example, an Internet Service Provider (ISP) providing Internet service to client device 110 can contract with security platform 122 to analyze applications which client device 110 attempts to download. As another example, the owner of client device 110 can install software on client device 110 that communicates with security platform 122 (e.g., to receive content packages from security platform 122, use the received content packages to check attachments in accordance with techniques described herein, and transmit applications to security platform 122 for analysis).

IV. Analyzing Samples Using Static/Dynamic Analysis

Figure 3:
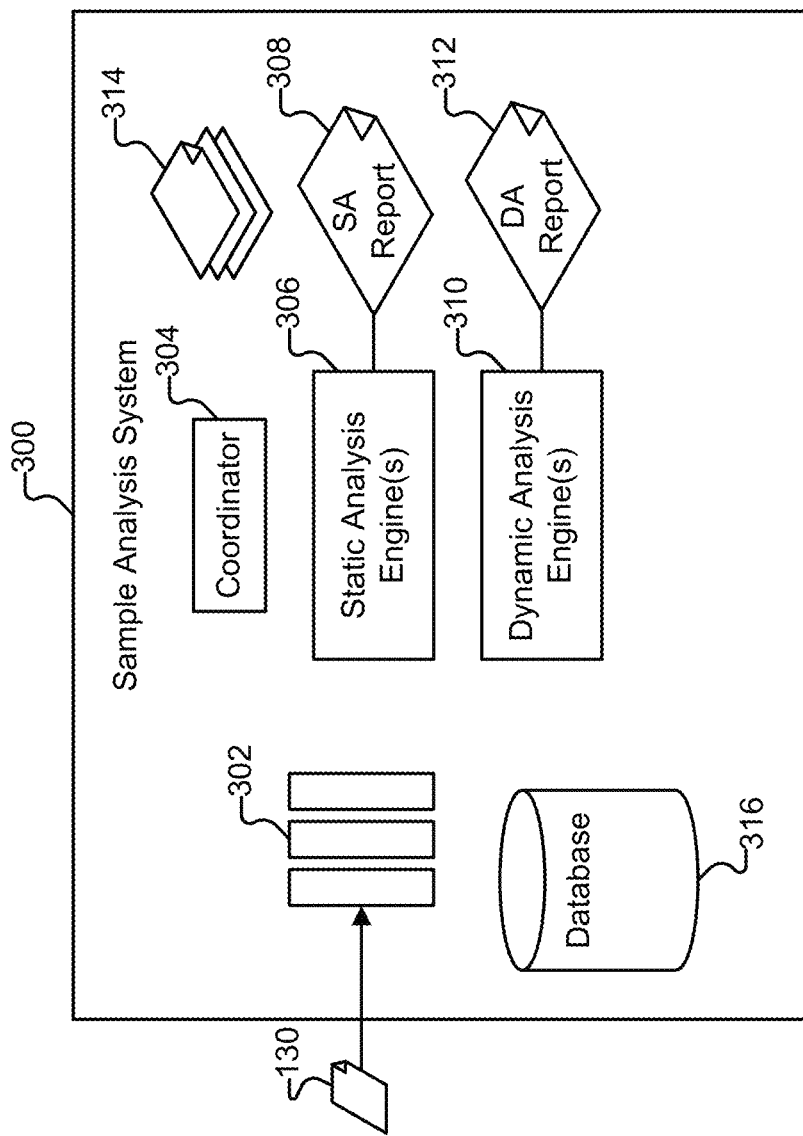
FIG. 3 illustrates an example of logical components that can be included in a system for analyzing samples.

FIG. 3 illustrates an example of logical components that can be included in a system for analyzing samples. Analysis system 300 can be implemented using a single device. For example, the functionality of analysis system 300 can be implemented in a malware analysis module 112 incorporated into data appliance 102. Analysis system 300 can also be implemented, collectively, across multiple distinct devices. For example, the functionality of analysis system 300 can be provided by security platform 122.

In various embodiments, analysis system 300 makes use of lists, databases, or other collections of known safe content and/or known bad content (collectively shown in FIG. 3 as collection 314). Collection 314 can be obtained in a variety of ways, including via a subscription service (e.g., provided by a third party) and/or as a result of other processing (e.g., performed by data appliance 102 and/or security platform 122). Examples of information included in collection 314 are: URLs, domain names, and/or IP addresses of known malicious servers; URLs, domain names, and/or IP addresses of known safe servers; URLs, domain names, and/or IP addresses of known command and control (C&C) domains; signatures, hashes, and/or other identifiers of known malicious applications; signatures, hashes, and/or other identifiers of known safe applications; signatures, hashes, and/or other identifiers of known malicious files (e.g., Android exploit files); signatures, hashes, and/or other identifiers of known safe libraries; and signatures, hashes, and/or other identifiers of known malicious libraries.

A. Ingestion

In various embodiments, when a new sample is received for analysis (e.g., an existing signature associated with the sample is not present in analysis system 300), it is added to queue 302. As shown in FIG. 3, application 130 is received by system 300 and added to queue 302.

B. Static Analysis

Coordinator 304 monitors queue 302, and as resources (e.g., a static analysis worker) become available, coordinator 304 fetches a sample from queue 302 for processing (e.g., fetches a copy of malware 130). In particular, coordinator 304 first provides the sample to static analysis engine 306 for static analysis. In some embodiments, one or more static analysis engines are included within analysis system 300, where analysis system 300 is a single device. In other embodiments, static analysis is performed by a separate static analysis server that includes a plurality of workers (i.e., a plurality of instances of static analysis engine 306).

The static analysis engine obtains general information about the sample, and includes it (along with heuristic and other information, as applicable) in a static analysis report 308. The report can be created by the static analysis engine, or by coordinator 304 (or by another appropriate component) which can be configured to receive the information from static analysis engine 306. In some embodiments, the collected information is stored in a database record for the sample (e.g., in database 316), instead of or in addition to a separate static analysis report 308 being created (i.e., portions of the database record form the report 308). In some embodiments, the static analysis engine also forms a verdict with respect to the application (e.g., "safe," "suspicious," or "malicious"). As one example, the verdict can be "malicious" if even one "malicious" static feature is present in the application (e.g., the application includes a hard link to a known malicious domain). As another example, points can be assigned to each of the features (e.g., based on severity if found; based on how reliable the feature is for predicting malice; etc.) and a verdict can be assigned by static analysis engine 306 (or coordinator 304, if applicable) based on the number of points associated with the static analysis results.

C. Dynamic Analysis

Once static analysis is completed, coordinator 304 locates an available dynamic analysis engine 310 to perform dynamic analysis on the application. As with static analysis engine 306, analysis system 300 can include one or more dynamic analysis engines directly. In other embodiments, dynamic analysis is performed by a separate dynamic analysis server that includes a plurality of workers (i.e., a plurality of instances of dynamic analysis engine 310).

Each dynamic analysis worker manages a virtual machine instance. In some embodiments, results of static analysis (e.g., performed by static analysis engine 306), whether in report form (308) and/or as stored in database 316, or otherwise stored, are provided as input to dynamic analysis engine 310. For example, the static report information can be used to help select/customize the virtual machine instance used by dynamic analysis engine 310 (e.g., Microsoft Windows 7 SP 2 vs. Microsoft Windows 10 Enterprise, or iOS 11.0 vs. iOS 12.0). Where multiple virtual machine instances are executed at the same time, a single dynamic analysis engine can manage all of the instances, or multiple dynamic analysis engines can be used (e.g., with each managing its own virtual machine instance), as applicable. As will be explained in more detail below, during the dynamic portion of the analysis, actions taken by the application (including network activity) are analyzed.

In various embodiments, static analysis of a sample is omitted or is performed by a separate entity, as applicable. As one example, traditional static and/or dynamic analysis may be performed on files by a first entity. Once it is determined (e.g., by the first entity) that a given file is malicious, the file can be provided to a second entity (e.g., the operator of security platform 122) specifically for additional analysis with respect to the malware's use of network activity (e.g., by a dynamic analysis engine 310).

The environment used by analysis system 300 is instrumented/hooked such that behaviors observed while the application is executing are logged as they occur (e.g., using a customized kernel that supports hooking and logcat). Network traffic associated with the emulator is also captured (e.g., using pcap). The log/network data can be stored as a temporary file on analysis system 300, and can also be stored more permanently (e.g., using HDFS or another appropriate storage technology or combinations of technology, such as MongoDB). The dynamic analysis engine (or another appropriate component) can compare the connections made by the sample to lists of domains, IP addresses, etc. (314) and determine whether the sample has communicated (or attempted to communicate) with malicious entities.

As with the static analysis engine, the dynamic analysis engine stores the results of its analysis in database 316 in the record associated with the application being tested (and/or includes the results in report 312 as applicable). In some embodiments, the dynamic analysis engine also forms a verdict with respect to the application (e.g., "safe," "suspicious," or "malicious"). As one example, the verdict can be "malicious" if even one "malicious" action is taken by the application (e.g., an attempt to contact a known malicious domain is made, or an attempt to exfiltrate sensitive information is observed). As another example, points can be assigned to actions taken (e.g., based on severity if found; based on how reliable the action is for predicting malice; etc.) and a verdict can be assigned by dynamic analysis engine 310 (or coordinator 304, if applicable) based on the number of points associated with the dynamic analysis results. In some embodiments, a final verdict associated with the sample is made based on a combination of report 308 and report 312 (e.g., by coordinator 304).

V. Inline Malware Detection

Returning to the environment of FIG. 1, millions of new malware samples may be generated each month (e.g., by nefarious individuals such as the operator of system 120, whether by making subtle changes to existing malware or by authoring new malware). Accordingly, there will exist many malware samples for which security platform 122 (at least initially) has no signature. Further, even where security platform 122 has generated signatures for newly created malware, resource constraints prevent data appliances, such as data appliance 102, from having/using a list of all known signatures (e.g., as stored on platform 122) at any given time.

Sometimes malware, such as malware 130, will successfully penetrate network 140. One reason for this is where data appliance 102 operates on a "first-time allow" principle. Suppose that when data appliance 102 does not have a signature for a sample (e.g., sample 130) and submits it to security platform 122 for analysis, it takes security platform 122 approximately five minutes to return a verdict (e.g., "benign," "malicious," "unknown," etc.). Instead of blocking communications between system 120 and client device 104 during that five minute time period, under a first-time allow principle, the communication is allowed. When a verdict is returned (e.g., five minutes later), data appliance 102 can use the verdict (e.g., "malicious") to block subsequent transmissions of malware 130 to network 140, can block communications between system 120 and network 140, etc. In various embodiments, if a second copy of sample 130 arrives at data appliance 102 during the period data appliance 102 is awaiting a verdict from security platform 122, the second copy (and any subsequent copies) of sample 130 will be held by system 120 pending a response from security platform 122.

Unfortunately, during the five minutes that data appliance 102 awaits a verdict from security platform 122, a user of client device 104 could have executed malware 130, potentially compromising client device 104 or other nodes in network 140. As mentioned above, in various embodiments, data appliance 102 includes a malware analysis module 112. One task that malware analysis module 112 can perform is inline malware detection. In particular, and as will be described in more detail below, as a file (such as sample 130) passes through data appliance 102, machine learning techniques can be applied to perform efficient analysis of the file on data appliance 102 (e.g., in parallel with other processing performed on the file by data appliance 102) and an initial maliciousness verdict can be determined by data appliance 102 (e.g., while awaiting a verdict from security platform 122).

Various difficulties can arise in implementing such analysis on a resource constrained appliance such as data appliance 102. One critical resource on appliance 102 is session memory. A session is a network transfer of information, including the files that appliance 102 is to analyze in accordance with techniques described herein. A single appliance might have millions of concurrent sessions, and the memory available to persist during a given session is extremely limited. A first difficulty in performing inline analysis on a data appliance such as data appliance 102 is that, due to such memory constraints, data appliance 102 will typically not be able to process an entire file at once, but instead receive a sequence of packets which it needs to process, packet by packet. A machine learning approach used by data appliance 102 will accordingly need to accommodate packet streams in various embodiments. A second difficulty is that in some cases, data appliance 102 will be unable to determine where an end of a given file being processed occurs (e.g., the end of sample 130 in a stream). A machine learning approach used by data appliance 102 will accordingly need to be able to make a verdict about a given file potentially midstream (e.g., halfway through receipt/processing of sample 130 or otherwise prior to the actual file end) in various embodiments.

A. Machine Learning Models

As will be described in more detail below, in various embodiments, security platform 122 provides a set of machine learning models to data appliance 102 for data appliance 102 to use in conjunction with inline malware detection. The models incorporate features (e.g., n-grams or other features) determined by security platform 122 as corresponding to malicious files. Two example types of such models include linear classification models and non-linear classification models. Examples of linear classification models that can be used by data appliance 102 include logistic regression and linear support vector machines. An example of a non-linear classification model that can be used by data appliance 102 includes a gradient boosting tree (e.g., eXtreme Gradient Boosting (XGBoost)). The non-linear model is more accurate (and is better able to detect obfuscated/disguised malware), but the linear model uses considerably fewer resources on appliance 102 (and is more suitable for efficiently analyzing JavaScript or similar files).

As will be described in more detail below, which type of classification model is used for a given file being analyzed can be based on a filetype associated with the file (and determined, e.g., by a magic number).

1. Additional Detail on the Threat Engine

In various embodiments, data appliance 102 includes a threat engine 244. The threat engine incorporates both protocol decoding and threat signature matching during a respective decoder stage and pattern match stage. Results of the two stages are merged by a detector stage.

When data appliance 102 receives a packet, data appliance 102 performs a session match to determine to which session the packet belongs (allowing data appliance 102 to support concurrent sessions). Each session has a session state which implicates a particular protocol decoder (e.g., a web browsing decoder, an FTP decoder, or an SMTP decoder). When a file is transmitted as part of a session, the applicable protocol decoder can make use of an appropriate file-specific decoder (e.g., a PE file decoder, a JavaScript decoder, or a PDF decoder).

Figure 4:
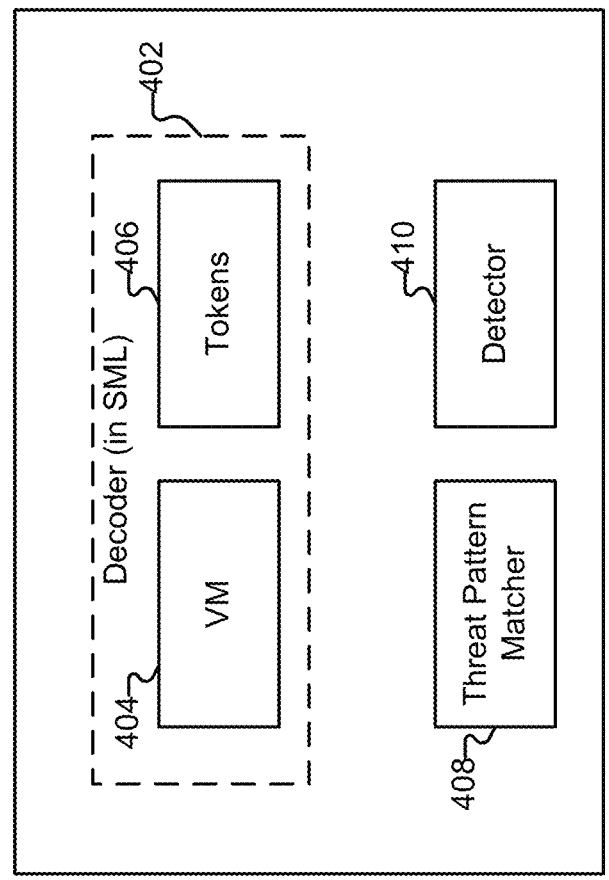
FIG. 4 illustrates portions of an example embodiment of a threat engine.

Portions of an example embodiment of threat engine 244 are shown in FIG. 4. For a given session, decoder 402 walks the traffic bytestream, following the corresponding protocol and marking contexts. One example of a context is an end-of-file context (e.g., encountering </script> while processing a JavaScript file). Decoder 402 can mark the end-of-file context in the packet, which can then be used to trigger execution of the appropriate model using the file's observed features. In some cases (e.g., FTP traffic), explicit protocol-level tags may not be present for decoder 402 to identify/mark context with. As will be described in more detail below, in various embodiments, decoder 402 can use other information (e.g., file size as reported in a header) to determine when feature extraction of a file should end (e.g., the overlay section begins) and execution using an appropriate model should be commenced.

Decoder 402 comprises two parts. The first part of decoder 402 is a virtual machine portion (404) which can be implemented as a state machine using a state machine language. The second part of decoder 402 is a set of tokens 406 (e.g., deterministic finite automaton (DFA) or regular expressions) for triggering state machine transitions and actions when matched in traffic. Threat engine 244 also includes a threat pattern matcher 408 (e.g., using regular expressions) that performs pattern matching (e.g., against threat patterns). As one example, threat pattern matcher 408 can be provided (e.g., by security platform 122) with a table of strings (whether exact strings or wildcard strings) to match against, and corresponding actions to take in the event a string match is found. Detector 410 processes outputs provided by decoder 402 and threat pattern matcher 408 to take various actions.

2. N-Grams

The data in a session can be broken into a sequence of n-grams—a series of byte strings. As an example, suppose a portion of hexadecimal data in a session is: "1023ae42f6f28762aab." The 2-grams in the sequence are all the pairs of adjacent characters, such as: "1023," "23ae," "ae42," "42f6," etc. In various embodiments, threat engine 244 is configured to analyze files using 8-grams. Other n-grams can also be used, such as 7-grams or 4-grams. In the example string above, "1023ae42f6f28762" is an 8-gram, "23ae42f6f28762aa" is an 8-gram, etc. The total number of different 8-grams possible in a byte sequence is $2^{64}$ (18,446,744,073,709,551,616). Searching for all possible 8-grams in a byte sequence would readily exceed the resources of data appliance 102. Instead, and as will be described in more detail below, a significantly reduced set of 8-grams is provided by security platform 122 to data appliance 102 for use by threat engine 244.

As session packets corresponding to a file are received by threat engine 244, threat pattern matcher 408 parses the packets for matches against strings in a table (e.g., by performing regular expression and/or exact string matches). A list of matches (e.g., with each instance of a match identified by a corresponding pattern ID) and at what offset each match occurred is generated. Actions on those matches are taken in the order of the offset (e.g., from lower to higher). For a given match (i.e., corresponding to a particular pattern ID), a set of one or more actions to take is specified (e.g., via an action table that maps actions to pattern IDs).

The set of 8-grams provided by security platform 122 can be added (e.g., as exact string matches) as additions to the table of matches that threat pattern matcher 408 is already performing (e.g., heuristic matches looking for specific indicia of malware, such as where a JavaScript file accesses a password store, or a PE file calls the Local Security Authority Subsystem Service (LSASS) API). One advantage of this approach is that, instead of performing multiple passes through the packet (e.g., first evaluating for heuristic matches, and then evaluating for 8-gram matches), the 8-grams can be searched for in parallel with other searches performed by threat pattern matcher 408.

As will be described in more detail below, 8-gram matches are used by both linear and non-linear classification models in various embodiments. Example actions that can be specified for n-gram matches include incrementing a weighted counter (e.g., for a linear classifier) and saving the match in a feature vector (e.g., for a non-linear classifier). Which action is taken can be specified based on the filetype associated with the packet (which determines which type of model is used).

3. Selecting a Model

In some cases, a given filetype is specified within the file's header (e.g., as a magic number appearing in the first seven bytes of the file itself). In such a scenario, threat engine 244 can select an appropriate model corresponding to the specified file type (e.g., based on a table provided by security platform 122 that enumerates filetypes and corresponding models). In other cases, such as JavaScript, the magic number or other filetype identifier (if present in the header at all) may not be probative of which classification model should be used. As one example, JavaScript would have a filetype of "textfile." To identify filetypes such as JavaScript, decoder 402 can be used to perform deterministic finite state automaton (DFA) pattern matching and apply heuristics (e.g., identifying <script> and other indicators that the file is JavaScript). The determined filetype and/or selected classification model are saved in the session state. The filetype associated with a session can be updated as the session progresses, as applicable. For example, in a stream of text, when a <script> tag is encountered, the JavaScript filetype can be assigned for the session. When a corresponding </script> is encountered, the filetype can be changed (e.g., back to plaintext).

4. Linear Classification Models

One way to represent a linear model is by using the following linear equation:

$$\Sigma(\beta_i x_i) < C, i=1, 2, 3 \ldots, P$$

where P is the total number of features, $x_i$ is the ith feature, $\beta_i$ is the coefficient (weight) of feature $x_i$, and C is a threshold constant. In this example, C is the threshold for a verdict of maliciousness, meaning that if a summation for a given file is less than C, the file is assigned a verdict of benign, and if the summation is equal to or greater than C, the file is assigned a verdict of malicious.

One approach to using a linear classification model by data appliance 102 is as follows. A single float (d) is used to track the score of the incoming file, and a hash table is used to store observed n-grams and corresponding coefficients (i.e., $x_i$ and $\beta_i$). For each incoming packet, each of the n-gram features (e.g., as provided by security platform 122) is checked against. Whenever a match is found of a feature ($x_i$) in the hash table, the single float ($\beta_i$) which matches that feature in the hash table is added (e.g., to d). When the end of the file is reached, a comparison of the single float (d) against the threshold value (C) is performed to determine a verdict for the file.

For n-gram counting, feature $x_i$ is equal to the number of times the ith n-gram is observed. Suppose the ith n-gram is observed for a particular file four times. $4*\beta_i$ can be rewritten as $\beta_i+\beta_i+\beta_i+\beta_i$. Instead of counting how many times (i.e., 4 times) the ith n-gram is observed and then multiplying by $\beta_i$, an alternate approach is to add $\beta_i$ each time the ith n-gram is observed. Furthermore, suppose that the jth n-gram is observed for the file three times. $3*\beta_j$ can similarly be written as $\beta_j+\beta_j+\beta_j$, each time adding $\beta_j$ instead of counting how many times $\beta_j$ was observed and then adding at the end.

To find $\Sigma(\beta_i x_i)$, each of $\beta_i x_i$, $\beta_j x_j$, . . . (where . . . corresponds to all of the other features/weights) is added. This can be rewritten as $\beta_i+\beta_i+\beta_i+\beta_j+\beta_j+\beta_j+\beta_j+\ldots$ Because addition is cumulative, addition of the values can be added in any order (e.g., $\beta_i+\beta_j+\beta_i+\beta_j+\beta_i+\beta_i+\beta_j+$ etc.) and accumulated into a single float. Here, suppose that a float (d) starts at 0.0. Each time feature $x_i$ is observed, $\beta_i$ can be added to float d, and each time $x_j$ is observed, $\beta_j$ can be added to float d. This approach allows a 4 byte float to be used as the entire per session memory, and is contrasted with an approach in which the per session memory is proportional to the number of features, where the entire feature vector is stored in memory so that it can be multiplied by the weight vector. Using an example of 4 bytes*1,000 4 Kbyte features, 4K would be needed for storage (compared to the single 4 byte float), which is 1,000 times more expensive.

5. Non-Linear Classification Models

A variety of non-linear classification approaches can be used in conjunction with the techniques described herein. One example of a non-linear classification model is a gradient boosting tree. In this example, a feature vector is initialized to all-zero vectors. Unfortunately, for non-linear models (unlike linear models), the entire set of features for which presence is being detected (e.g., 1,000 features) is persisted for the entire duration of the session. While this is less efficient than in the linear approach, some efficiency can still be gained by down-sampling the features to be one byte (0-255) rather than a full 4 byte float (as might be used on a device that is not memory constrained).

As data appliance 102 scans through the file, each time a feature is observed, the value of that feature is increased by one in the feature vector. Once the end of file is reached (or termination of feature observation otherwise occurs), the constructed feature vector is fed into a gradient boosting tree model (e.g., received from security platform 122). As will be described in more detail below, the non-linear classification model can be built using both n-gram (e.g., 8-gram) and non n-gram features. One example of a non n-gram feature is the purported size of the file (which can be read as a value out of a packet containing the file's header). Any file data appearing after the purported end of the file (e.g., as based on the file size specified in the header) is referred to as an overlay. In addition to serving as a feature, the purported file length can be used as a proxy for how long the file is expected to be. The non-linear classifier can be run against the file's packet stream until the purported file length is reached, and then a verdict can be formed for the file irrespective of whether or not the end of file was in fact reached. That a given file includes an overlay is also an example of a feature that can be used as part of the non-linear classification model. In various embodiments, the overlay portion of the file is not analyzed, again—analysis can be performed prior to the actual end of file. In other embodiments, feature extraction occurs, and a maliciousness verdict is not formed until the actual end of file is reached.

Figure 5:
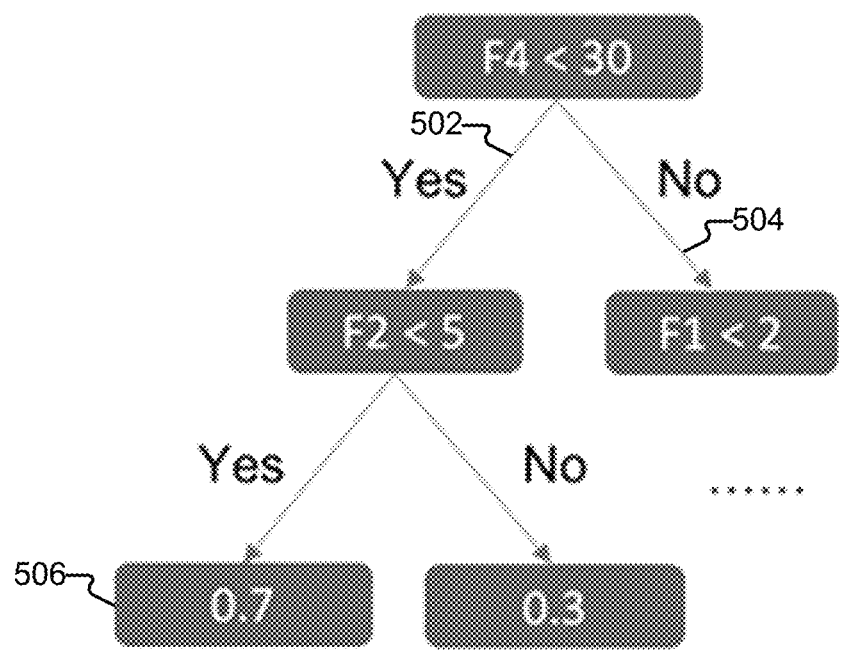
FIG. 5 illustrates an example of a portion of a tree.

In an example embodiment, the tree model comprises 5,000 binary trees. Every node on each tree contains a feature and a corresponding threshold. An example of a portion of a tree is depicted in FIG. 5. In the example shown in FIG. 5, if the value for a feature (e.g., feature F4) is less than its threshold (e.g., 30), the left branch is taken (502). If the value for the feature is equal to or greater than the threshold, then the right branch is taken (504). The tree is walked until a leaf node is reached (e.g., node 506), which has an associated value (e.g., 0.7). The values of each leaf reached (for each of the trees) are summed (rather than multiplied) to get a final score to calculate the verdict. If the score is below a threshold, the file can be considered benign, and if it is at or above the threshold, the file can be considered malicious. The lack of multiplication in obtaining the final score helps make use of the model more efficient in the resource constrained environment of data appliance 102.

In various embodiments, the trees themselves are fixed on data appliance 102 (until an updated model is received) and can be stored in a shared memory that can be accessed by multiple sessions at the same time. The per session cost is the cost of storing the session's feature vector, which can be zeroed out once analysis of the session is completed.

6. Example Process

Figure 6:
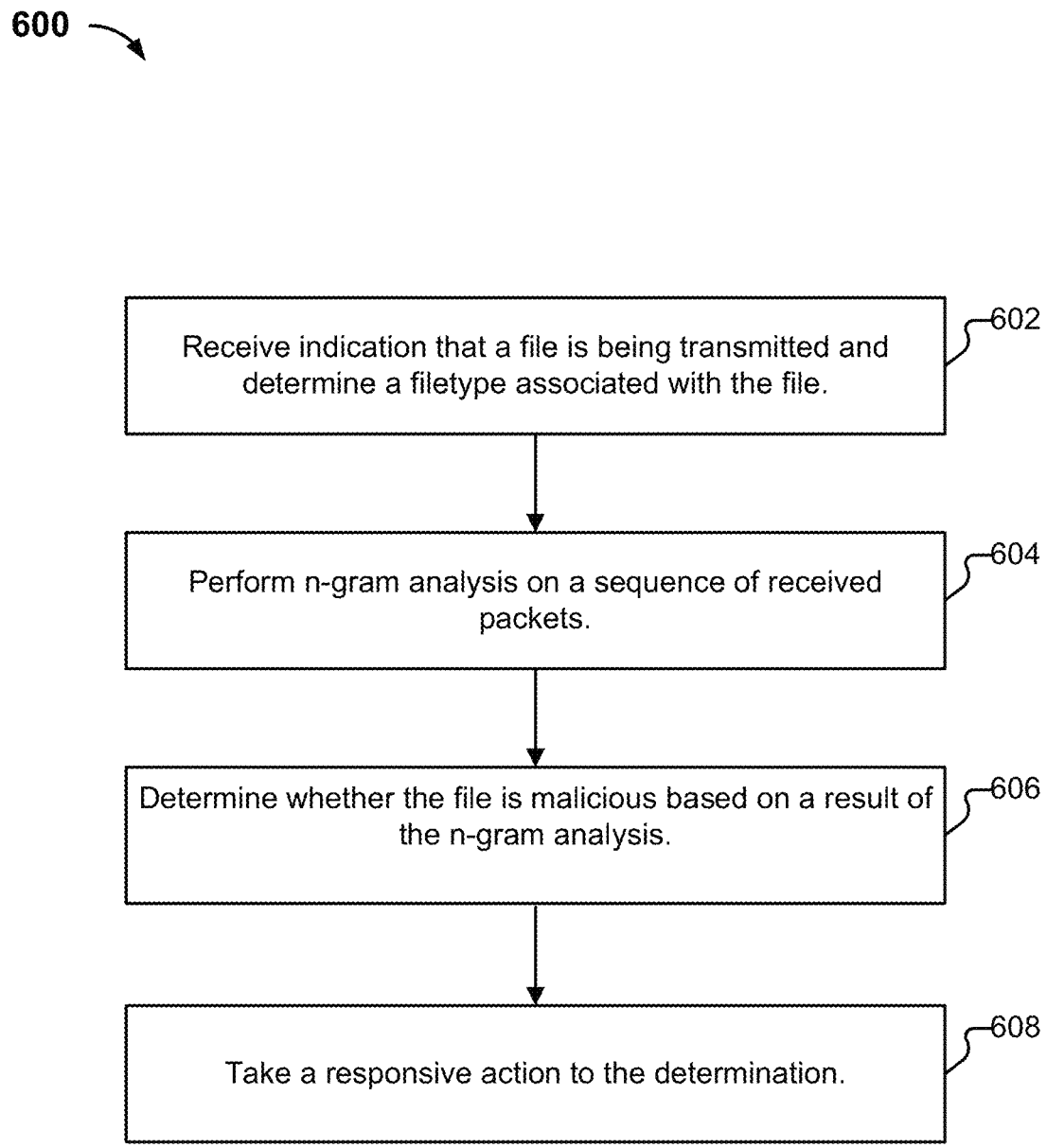
FIG. 6 illustrates an example of a process for performing inline malware detection on a data appliance.

FIG. 6 illustrates an example of a process for performing inline malware detection on a data appliance. In various embodiments, process 600 is performed by data appliance 102, and in particular by threat engine 244. Threat engine 244 can be implemented using a script (or set of scripts) authored in an appropriate scripting language (e.g., Python). Process 600 can also be performed on an endpoint, such as client device 110 (e.g., by an endpoint protection application executing on client device 110).

Process 600 begins at 602 when an indication is received by appliance 102 that a file is being transmitted as part of a session. As one example of the processing performed at 602, for a given session, an associated protocol decoder can call or otherwise make use of an appropriate file-specific decoder when the start of a file is detected by the protocol decoder. As explained above, the filetype is determined (e.g., by decoder 402) and associated with the session (e.g., so that subsequent filetype analysis need not be performed until the filetype changes or the file packets cease being transmitted).

At 604, n-gram analysis is performed on a sequence of received packets. As explained above, the n-gram analysis can be performed inline with other analyses being performed on the session by appliance 102. For example, while appliance 102 is performing analysis on a particular packet (e.g., to check for the presence of particular heuristics), it can also determine whether any 8-grams in the packet match 8-grams provided by security platform 122. During the processing performed at 604, when an n-gram match is found, the corresponding pattern ID is used to map the condition to an action based on filetype. The action either increments a weighted counter (e.g., where the filetype is associated with a linear classifier) or updates a feature vector to account for the match (e.g., where the filetype is associated with a non-linear classifier).

The n-gram analysis continues, packet by packet, until either an end-of-file condition or a checkpoint is reached. At that point (606), the appropriate model is used to determine a verdict for the file (i.e., comparing the final value obtained using the model against a maliciousness threshold). As mentioned above, the models incorporate n-gram features and can also incorporate other features (e.g., in the case of the non-linear classifier).

Finally, at 608, an action is taken in response to the determination made at 606. One example of a responsive action is terminating the session. Another example of a responsive action is allowing the session to continue, but preventing the file from being transmitted (and instead, being placed in a quarantine area). In various embodiments, appliance 102 is configured to share its verdicts (whether benign verdicts, malicious verdicts, or both) with security platform 122. When security platform 122 completes its independent analysis of the file, it can use the verdict reported by appliance 102 for a variety of purposes, including assessing the performance of the model that formed the verdict.

An example threat signature for a sample is shown in FIG. 7B. In particular, for a sample having a SHA-256 hash of "4d73f42438fb5a857915219cdfa9cbb4ce3f771ffed93af81b 0528931e4813f8," the first value in each pair corresponds to the feature, and the second value corresponds to a count. In the example shown in FIG. 7B, the features comprising numbers (e.g., feature "3905") correspond to n-gram features, and the features comprising "J" and a number (e.g., feature "J18") correspond to non n-gram features.

In an example embodiment, security platform 122 is configured to target a specific false positive rate (e.g., 0.001) when generating models for use by appliances such as data appliance 102. Accordingly, in some cases (e.g., one out of every one thousand files), data appliance 102 may incorrectly determine that a benign file is malicious when performing inline analysis using a model in accordance with techniques described herein. In such a scenario, if security platform 122 subsequently determines that the file is in fact benign, it can be added to a whitelist so that it is not subsequently flagged as being malicious (e.g., by another appliance).

One approach to whitelisting is for security platform 122 to instruct appliance 102 to add the file to a whitelist stored at appliance 102. Another approach is for security platform 122 to instruct whitelist system 154 of false positives and for whitelist system 154 in turn to keep appliances such as appliance 102 up to date with false positive information. As previously mentioned, one problem with appliances such as appliance 102 is that they are resource constrained. One approach to minimizing resources used in maintaining a whitelist at an appliance is to maintain the whitelist using a Least Recently Used (LRU) cache. The whitelist can comprise file hashes, and can also be based on other elements, such as feature vectors or hashes of feature vectors.

VI. Building Models

Returning to the environment depicted in FIG. 1, as previously explained, security platform 122 is configured to perform static and dynamic analysis on samples that it receives. Security platform 122 can receive samples for analysis from a variety of sources. As previously mentioned, one example type of sample source is a data appliance (e.g., data appliances 102, 136, and 148). Other sources (e.g., one or more third party providers of samples, such as other security appliance vendors, security researchers, etc.) can also be used as applicable. As will be described in more detail below, security platform 122 can use the corpus of samples that it receives to build models (e.g., which can then be used by security appliance 102 in accordance with embodiments of the techniques described herein).

Figure 8A:
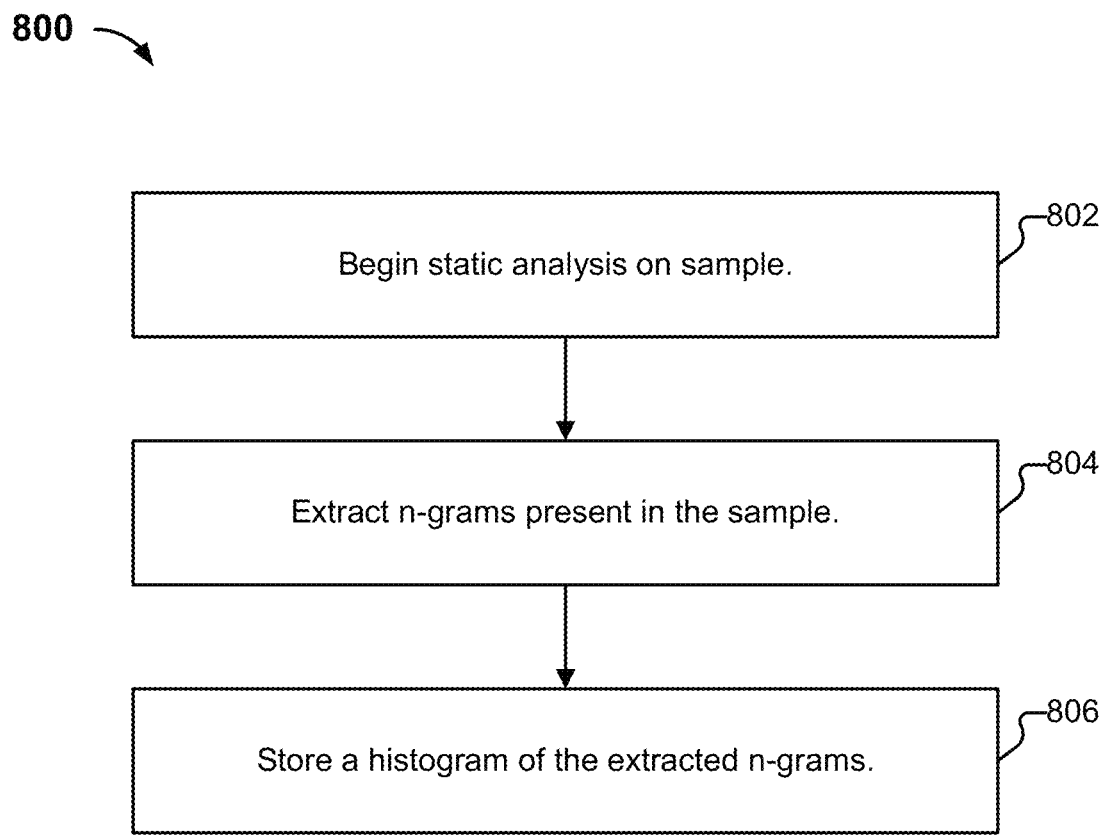
FIG. 8A illustrates an example of a process for performing feature extraction.

In various embodiments, static analysis engine 306 is configured to perform feature extraction on samples that it receives (e.g., while also performing other static analysis functions as described above). An example process for performing feature extraction (e.g., by security platform 122) is depicted in FIG. 8A. Process 800 begins at 802 when static analysis of a sample is commenced. During feature extraction (804), all 8-grams (or other applicable n-grams in embodiments where 8-grams are not used) are extracted out of the sample being processed (e.g., sample 130 in FIG. 3). In particular, a histogram of the 8-grams in the sample being analyzed is extracted (e.g., into a hash table), which indicates the number of times a given 8-gram was observed in the sample being processed. One benefit of extracting 8-grams during feature analysis by static analysis engine 306 is that potential privacy and contractual problems in using samples obtained from third parties (e.g., in constructing models) can be mitigated, as the original file cannot be reconstructed from the resulting histogram. The extracted histogram is stored at 806.

In various embodiments, static analysis engine 306 stores the extracted histogram (e.g., represented using a hash table) for a given sample in storage 142 (e.g., a Hadoop cluster) along with the histograms extracted from other samples. The data in Hadoop is compressed and when operations are performed on the Hadoop data, the needed data is uncompressed on the fly. An example hash table (represented in JSON) for a file is shown in FIG. 7A. Line 702 indicates the SHA-256 hash of the file. Line 704 indicates the UNIX time at which sample 130 arrives at security platform 122. Line 706 indicates a count of n-grams in the overlay section (e.g., 'd00fbf4e088bc366':1 represents that one instance of 'd00fbf4e088bc366' was found in the overlay section). Line 708 indicates a count of each of the 8-grams present in the file. Line 710 indicates that the file has an overlay. Line 712 indicates that the filetype of the file is ".exe." Line 714 indicates the UNIX time at which security platform 122 finished processing sample 130. Line 716 indicates a count of each of the non 8-gram features the file hit. Finally, line 718 indicates that the file was determined (e.g., by security platform 122) to be malicious.

In an example embodiment, the set of 8-gram histograms stored in the Hadoop cluster grows by approximately three terabytes of 8-gram histogram data per day. The histograms will correspond to both malicious and benign samples (which will be labeled as such, e.g., based on results of other static and dynamic analyses performed by security platform 122 as described above).

A histogram of 8-grams extracted from a sample being analyzed will be approximately 10% larger than the file itself, and a typical sample will have a histogram comprising approximately 1 million different 8-grams. The total number of different possible 8-grams is $2^{64}$. As mentioned above, in contrast, the classification models sent by security platform 122 (e.g., as part of a subscription) to devices such as data appliance 102, in various embodiments, comprise only a few thousand features (e.g., 1,000 features). One example way to reduce the set of potentially up to $2^{64}$ features to the most important 1,000 features for use in a model is to use a mutual information technique. Other approaches can also be used as applicable (e.g., Chi-squared score). The four needed parameters include the number of malicious samples having a given feature, the number of benign samples having the given features, the total number of malicious samples, and the total number of benign samples. One benefit of mutual information is that it can efficiently be used on very large data sets. In Hadoop, the mutual information approach can be performed in a single pass (i.e., through all the 8-gram histograms stored in the Hadoop cluster dataset for a given filetype) by distributing the task across multiple mappers, each of which is responsible for handling a specific feature. Those features having the highest mutual information can be selected as the set of features most indicative of maliciousness and/or most indicative of benignness, as applicable. The resulting 1,000 features can then be used to build models (e.g., linear classification models and non-linear classification models) as applicable. For example, to build a linear classification model, model builder 152 (implemented using a set of open source tools and/or scripts authored in an appropriate language such as python) saves the top 1,000 features and applicable weights as the set of n-gram features for appliance 102 to check against (e.g., as described in Section V.A.4 above).

In some embodiments, the non-linear classification model is also built by model builder 152 using the top 1,000 (or other desired number of) features. In other embodiments, the non-linear classification model is constructed predominantly using the top features (e.g., 950) but also incorporates other, non n-gram features (e.g., 50 such features) that can also be detected during packet-by-packet feature extraction and analysis. Some examples of non n-gram features that can be incorporated into the non-linear classification model include: (1) the size of the header, (2) the presence or absence of a checksum in the file, (3) number of sections in the file, (4) the purported length of the file (as indicated in the header of the PE file), (5) whether the file includes an overlay portion, and (6) whether the file requires the Windows EFI Subsystem to execute the PE.

In some embodiments, rather than using mutual information to select the top 1,000 features, a larger set of features (an over generated set of features) is determined. As an example, the top 5,000 features can initially be selected using mutual information. That set of 5,000 can then be used as input to a traditional feature selection technique (e.g., bagging) which might not scale well to very large datasets (e.g., the entire Hadoop dataset), but be more effective on a reduced set (e.g., 5,000 features). The traditional feature selection technique can be used to select the final 1,000 features from the set of 5,000 features identified using mutual information.

Once the final 1,000 features are selected, an example way to construct the non-linear model is to use an open source tool such as scikit-learn or XGBoost. As applicable, parameter tuning can be performed, such as by using cross-validation.

Figure 8B:
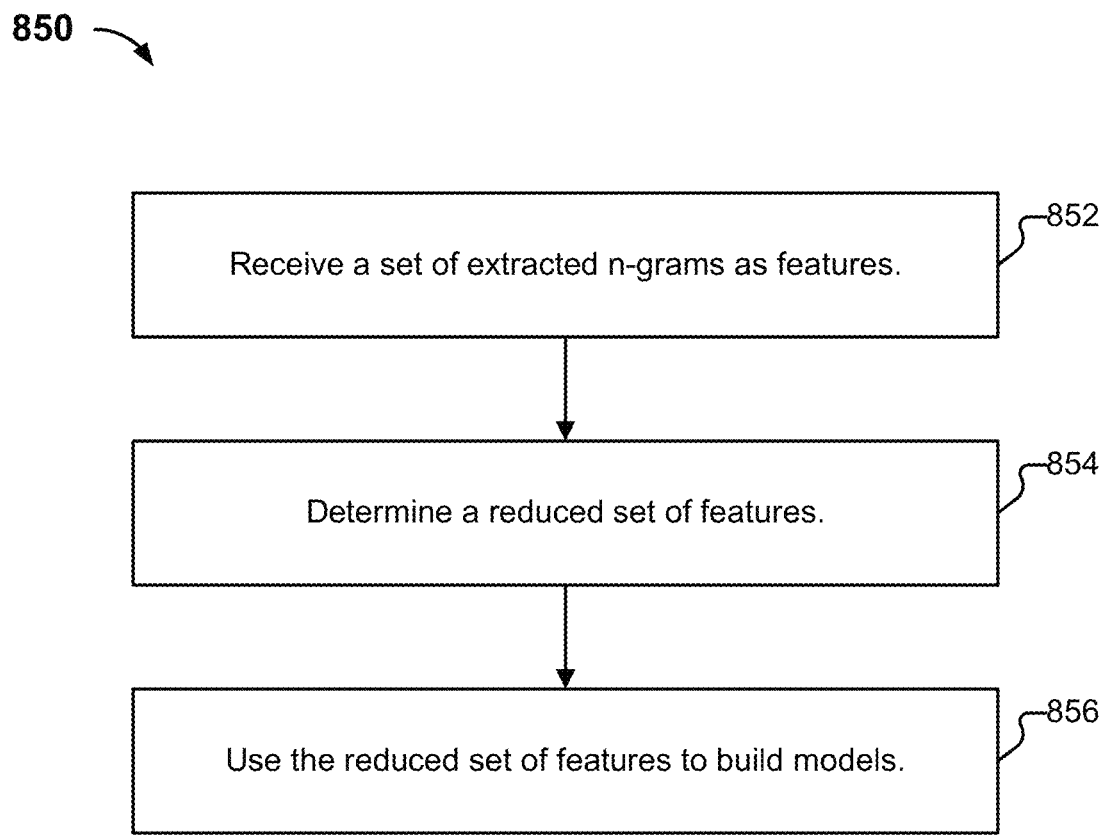
FIG. 8B illustrates an example of a process for generating a model.

An example process for generating a model is depicted in FIG. 8B. In various embodiments, process 850 is performed by security platform 122. Process 850 begins at 852 when a set of extracted features (e.g., including n-gram features) is received. One example way the set of features can be received is by reading features stored as a result of process 800. At 854, a reduced set of features is determined from the features received at 852. As described above, an example way of determining a reduced set of features is by using mutual information. Other approaches (e.g., Chi-squared score) can also be used. Further, as also described above, a combination of techniques can also be used at 852/854, such as selecting an initial set of features using mutual information and refining the initial set using bagging or another appropriate technique. Finally, as also described above, once the features are selected (e.g., at 854), appropriate models are built at 856 (e.g., using open source or other tools, and as applicable, performing parameter tuning). Models (e.g., generated by model builder 152 using process 850) can be sent (e.g., as part of a subscription service) to data appliance 102 and other applicable recipients (e.g., data appliances 136 and 148).

In various embodiments, model builder 152 generates models (e.g., linear and non-linear classification models) on a daily (or other applicable) basis. By performing process 850 or otherwise periodically generating models, security platform 122 can help ensure that the models used by appliances such as appliance 102 detect the most current types of malware threats (e.g., those most recently deployed by nefarious individuals).

Whenever a newly-generated model is determined to be better than an existing model (e.g., as determined based on a set of quality assessment metrics exceeding a threshold), updated models can be transmitted to data appliances such as data appliance 102. In some cases, such updates adjust weights assigned to features. Such updates can be readily deployed to and adopted by appliances (e.g., as real-time updates). In other cases, such updates adjust the features themselves. Such updates can be more complicated to deploy because they may require patches to components of the appliance, such as the decoder. One benefit of using overtraining during model generation is that the model can take into account whether the decoder is capable of detecting particular features or not.

In various embodiments, appliances are required (e.g., by security platform 122) to deploy updates to models as they are received. In other embodiments, appliances are allowed to selectively deploy updates (at least for a period of time). As one example, when a new model is received by appliance 102, the existing model and new model can both be run in parallel on appliance 102 for a period of time (e.g., with the existing model being used in production and the new model reporting on actions that it would take without actually taking them). An administrator of the appliance is able to indicate whether the existing model or the new model should be used to process traffic on the appliance (e.g., based on which model performs better). In various embodiments, appliance 102 provides telemetry back to security platform 122 that indicates information such as which model(s) are running on appliance 102 and how effective the model(s) are (e.g., false positive statistical information).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A security platform for providing information to a data appliance that includes a firewall for blocking traffic determined to be malicious using the information, comprising:
   a processor configured to:
      receive a set of features, including a first plurality of n-grams, extracted from a set of files comprising a first plurality of known malicious files and a second plurality of known non-malicious files, wherein, for each file included in the set of files, respective histograms of n-grams present in the respective each file were previously generated during static analysis performed on the respective each file;
      determine, using a mutual information technique and from the received set of features, a reduced set of features that includes a reduced set of the n-grams included in the first plurality of n-grams, wherein determining the reduced set of features includes preferentially including in the reduced set of features a first n-gram that is more indicative of maliciousness, because the first n-gram is present in the first plurality of known malicious files and is not present in the second plurality of known non-malicious files, than a second n-gram that is not preferentially included in the reduced set of features, because the second n-gram is present in the first plurality of known malicious files and is also present in the second plurality of known non-malicious files; and
      use the reduced set of features to generate a model usable by the data appliance to perform in line malware analysis of samples received by the data appliance;
      wherein:
         the generated model includes the first n-gram and the generated model does not include the second n-gram;
         performing the inline malware analysis includes detecting as malicious a first sample, by the data appliance performing n-gram analysis on a sequence of packets of the first sample, received by the data appliance, wherein a maliciousness signature for the first sample is not present on the data appliance; and
         using the first plurality of n-grams extracted from the set of known malicious and known non-malicious files in the inline malware analysis would render the data appliance inoperable;
   and a memory coupled to the processor and configured to provide the processor with instructions.

2. The system of claim 1, wherein the reduced set of features includes features extracted from the first plurality of known malicious files.

3. The system of claim 1, wherein the reduced set of features includes features extracted from the second plurality of known non-malicious files.

4. The system of claim 1, wherein the generated model further includes at least one non n-gram feature.

5. The system of claim 4, wherein the at least one non n-gram feature is associated with a file size.

6. The system of claim 4, wherein the at least one non n-gram feature is associated with a header size.

7. The system of claim 4, wherein the at least one non n-gram feature is associated with at least one of a presence or an absence of a checksum in a file.

8. The system of claim 4, wherein the at least one non n-gram feature is associated with a number of sections in a file.

9. The system of claim 4, wherein the at least one non n-gram feature is associated with a purported length of a file.

10. The system of claim 4, wherein the at least one non n-gram feature is associated with whether a file includes an overlay.

11. The system of claim 1, wherein the model is a linear model.

12. The system of claim 1, wherein the model is a non-linear model.

13. The system of claim 1, wherein in response to a false positive result reported by the data appliance, the processor is configured to generate an updated model and transmit the updated model to another data appliance.

14. A method for providing information to a data appliance that includes a firewall for blocking traffic determined to be malicious using the information, comprising:
   receiving a set of features, including a first plurality of n-grams, extracted froma set of files comprising a first plurality of known malicious files and a second plurality of known non-malicious files, wherein, for each file included in the set of files, respective histograms of n-grams present in the respective each file were previously generated during static analysis performed on the respective each file;
   determining, using a mutual information technique and from the received set of features, a reduced set of features that includes a reduced set of the n-grams included in the first plurality of n-grams, wherein determining the reduced set of features includes preferentially including in the reduced set of features a first n-gram that is more indicative of maliciousness, because the first n-gram is present in the first plurality of known malicious files and is not present in the second plurality of known non-malicious files, than a second n-gram that is not preferentially included in the reduced set of features, because the second n-gram is present in the first plurality of known malicious files and is also present in the second plurality of known non-malicious files; and
   using the reduced set of features to generate a model usable by the data appliance to perform in line malware analysis of samples received by the data appliance;
   wherein:
      the generated model includes the first n-gram and the generated model does not include the second n-gram;
      performing the inline malware analysis includes detecting as malicious a first sample, by the data appliance performing n-gram analysis on a sequence of packets of the first sample, received by the data appliance, wherein a maliciousness signature for the first sample is not present on the data appliance; and
      using the first plurality of n-grams extracted from the set of known malicious and known non-malicious files in the inline malware analysis would render the data appliance inoperable.

15. A computer program product embodied in a non-transitory computer readable storage medium and comprising computer instructions for:
receiving a set of features, including a first plurality of n-grams, extracted from a set of files comprising a first plurality of known malicious files and a second plurality of known non-malicious files, wherein, for each file included in the set of files, respective histograms of n-grams present in the respective each file were previously generated during static analysis performed on the respective each file;
determining, using a mutual information technique and from the received set of features, a reduced set of features that includes a reduced set of the n-grams included in the first plurality of n-grams, wherein determining the reduced set of features includes preferentially including in the reduced set of features a first n-gram that is more indicative of maliciousness, because the first n-gram is present in the first plurality of known malicious files and is not present in the second plurality of known non-malicious files, than a second n-gram that is not preferentially included in the reduced set of features, because the second n-gram is present in the first plurality of known malicious files and is also present in the second plurality of known non-malicious files; and
using the reduced set of features to generate a model usable by the data appliance to perform in line malware analysis of samples received by the data appliance; wherein:
the generated model includes the first n-gram and the generated model does not include the second n-gram;
performing the inline malware analysis includes detecting as malicious a first sample, by the data appliance performing n-gram analysis on a sequence of packets of the first sample, received by the data appliance, wherein a maliciousness signature for the first sample is not present on the data appliance; and
using the first plurality of n-grams extracted from the set of known malicious and known non-malicious files in the inline malware analysis would render the data appliance inoperable.

16. The method of claim 14, wherein the reduced set of features includes features extracted from the first plurality of known malicious files.

17. The method of claim 14, wherein the reduced set of features includes features extracted from the second plurality of known non-malicious files.

18. The method of claim 14, wherein the generated model further includes at least one non n-gram feature.

19. The method of claim 18, wherein the at least one non n-gram feature is associated with a file size.

20. The method of claim 18, wherein the at least one non n-gram feature is associated with a header size.

21. The method of claim 18, wherein the at least one non n-gram feature is associated with at least one of a presence or an absence of a checksum in a file.

22. The method of claim 18, wherein the at least one non n-gram feature is associated with a number of sections in a file.

23. The method of claim 18, wherein the at least one non n-gram feature is associated with a purported length of a file.

24. The method of claim 18, wherein the at least one non n-gram feature is associated with whether a file includes an overlay.

25. The method of claim 14, wherein the model is a linear model.

26. The method of claim 14, wherein the model is a non-linear model.

27. The method of claim, 14, further comprising, in response to receiving a false positive result reported by the data appliance, generating an updated model and transmit the updated model to another data appliance.

* * * * *